Patented Oct. 23, 1951

2,572,256

UNITED STATES PATENT OFFICE 2,572,256

TRANSPARENT UREA-ALDEHYDE TYPE RESINS AND METHOD FOR PRODUCING THE SAME

Philip James Garner, Hooten, Wirral, and Ralph Edward Bowman, Little Chalfont, England, assignors to Shell Development Company, San Francisco, Calif., a corporation of Delaware No Drawing. Application May 17, 1948, Serial No. 27,606. In Great Britain June 4, 1947

13 Claims. (Cl. 260—69)

This invention relates to a new class of synthetic resins. More particularly the invention relates to novel urea-aldehyde type resins and to a method for their preparation.

More specifically the invention provides a new and particularly useful class of urea-aldehyde type resins which are produced by condensing an aldehyde, or substance liberating an aldehyde, with urea and/or thiourea in the presence of a minor quantity (as compared with the quantity of urea and/or thiourea) of one or more polyfunctional urea derivatives to be described hereinafter, and subsequently polymerizing the resulting condensation product to produce the desired resins, or alternatively, by forming a partial condensation product of the aldehyde or substance liberating an aldehyde, urea and/or thiourea, adding the minor quantity of one or more poly-functional urea derivatives to the resulting condensation product and further condensing and/or polymerizing the admixture to produce the desired resins. The artificial resins produced by such processes may be cured to hard products characterized by their superior transparency, their excellent surface qualities, i. e. free of bubbles and other irregularities, and by their increased strength and flexibility. The novel resins are particularly characterized by the fact that they may be produced at a much lower cost than any of the transparent urea-aldehyde type resins disclosed heretofore.

It is well known that urea will condense with formaldehyde to form a condensation product which may be polymerized to form relatively good synthetic resins. Many of the urea-aldehyde type resins, however, possess certain defective characteristics which prevent them from being utilized for many industrial purposes. Heretofore, for example, considerable difficulty was encountered in producing urea-aldehyde type resins which were transparent, possessed surfaces free of bubbles and other irregularities, and possessed a sufficient degree of hardness to enable them to be used for most commercial purposes.

Many attempts have been made in the past to correct these defective characteristics of the urea-aldehyde type resins and thereby produce resins of this type which could be utilized on a large commercial scale. Improvements in the properties of the resins have been attempted, for example, by changing the method for their preparation, by adding other ingredients to the reaction mixture, or by changing the nature of the urea and aldehyde compounds used in the condensation. All such attempts in the past have failed, however, either due to the fact that such changes have resulted in no improvement in the above-described defective characteristics, have resulted in destroying many of the more favorable properties of the urea-aldehyde type resins, or have made the cost of the resulting resins so high as to make their use on any large commercial scale highly impracticable. It has been proposed, for example, to produce improved urea-aldehyde type resins by replacing the relatively cheap urea with expensive alkylene or arylene di-urea compounds, but, while the resulting resins possessed a slight improvement in some of their properties, the resins were still lacking in the desired degree of hardness, flexibility, possessed poor surface qualities and, as a particularly important defect, had such a high cost of production that their use on any large scale was prohibited.

It is an object of the invention, therefore, to provide a new and highly useful class of urea-aldehyde type resins. It is a further object of the invention to provide a new class of urea-aldehyde type resins which possess excellent transparency, possess improved surface qualities, and are hard and flexible enough to be used for most commercial purposes. It is a further object of the invention to provide a new class of urea-aldehyde type resins which possess the above-described superior properties and may be produced at a relatively low cost. It is a further object to provide an economical and highly efficient method for the production of improved urea-aldehyde type resins. It is a further object of the invention to provide novel urea formaldehyde type resins which are clear and transparent, free of bubbles, have increased strength and flexibility, and may be produced at a very low cost. Other objects of the invention will be apparent from the detailed description given hereinafter.

It has now been discovered that urea-aldehyde type resins possessing the above-described superior properties may be readily produced by condensing an aldehyde, or substance liberating an aldehyde, with urea and/or thiourea in the presence of a minor quantity (as compared with the quantity of urea and/or thiourea) of one or more poly-functional urea derivatives to be described hereinafter, and subsequently polymerizing the resulting condensation product to produce the desired resins, or alternatively, by forming a partial condensation product of the aldehyde or substance liberating an aldehyde, urea and/or thiourea, adding the minor quantity of one or more poly-functional urea derivatives to the resulting condensation product and further condensing and/or polymerizing the admixture to produce the desired resins. When cured to the desired degree the above-described resins are very clear and transparent, possess a very smooth, attractive surface which is free of bubbles and other irregularities, and have a degree of hardness and flexibility sufficient to enable the resins to be used for most commercial purposes. The novel resins are particularly characterized by the low cost with which they may be produced.

The poly-functional urea derivatives which are to be utilized in producing the novel resins of the invention are compounds of the general formula:

$$(H_2NCXNH)_nR$$

wherein R represents a polyvalvent substituted hydrocarbon radical or an unsubstituted hydrocarbon radical, X represents a member of the group comprising oxygen and sulfur atoms, and $n$ is an integer greater than 1.

The polyvalvent unsubstituted hydrocarbon radicals which R may represent in the above-described formula may be saturated, unsaturated, cyclic, acyclic or aromatic. The polyvalvent hydrocarbon radicals may be derived from hydrocarbon radicals such as ethane, isopropane, butane, octane, decane, dodecane, pentadecane, ethylene, butene, octene, decene, benzene, cyclohexane, toluene, 2,5-dimethylcyclohexane, cyclopentane, cyclohexene, cyclopentene, and the like. The exact valence of the hydrocarbon radical will be determined by the value assigned to $n$ in the above-described formula. Thus, for example, if $n$ is 2 the bivalent hydrocarbon radicals which may be derived from butane would be $—CH_2CH_2CH_2CH_2—$,

The substituted polyvalent hydrocarbon radicals which R may represent in the above-described formula are the same as those hydrocarbon radicals described in the above paragraph wherein at least one of the hydrogen atoms has been replaced by an inorganic element or radical or by an organic radical. Examples of the inorganic elements that may be attached to the polyvalent hydrocarbon radicals are the halogen atoms, such as chlorine and bromine. Examples of the organic radicals that may be substituted on the hydrocarbon radicals are the carboxyl and acyl radicals and the like. The substituted polyvalent hydrocarbon radicals may be exemplified by the bivalent radicals derived from the butyl radicals such as $—CH_2CHCOCH_3CH_2CH_2—$,

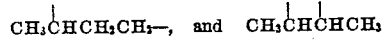

Representative examples of some of the poly-functional urea derivatives which may be utilized on the invention are:

1,4-butylene diurea
1,3-pentylene diurea
1,4,6-triureido hexane
1,2-phenylene diurea
1,5,7-triureido decane
2,4-pentylene diurea
2,6-heptylene diurea
1,4-butylene dithiourea
1,3-naphthylene dithiourea
1,5-napthylene diurea
1,3-heptylene diurea
1,2,4-triureido naphthalene
1,5-heptylene dithiourea The preferred poly-functional urea derivatives to be utilized in the production of the novel resins of the invention are those of the above described formula wherein R is a polyvalent hydrocarbon radical derived from alkyl hydrocarbons containing from 2 to 10 carbon atoms, $n$ is an integer between 2 and 3, and X is an oxygen or sulfur atom. Examples of such preferred poly-functional urea derivatives are:

Ethylene diurea
1,4-butylene diurea
1,3,5-triureido heptane
1,3-octylene diurea
1,5-decylene diurea
2,4-pentylene dithiourea
Ethylene dithiourea
1,3,5-trithioureido heptane The poly-functional urea derivative selected for use in the production of the novel resins should be soluble in the medium in which the formation is to take place. Ethylene diurea is sufficiently soluble in water in the required proportions and is a particularly preferred poly-functional urea derivative to be utilized in the production of the novel resins when the formation reactions take place in an aqueous medium.

The aldehydes to be utilized in the production of the novel resins of the invention are those of the formula:

wherein $R_1$ is a member of the group comprising a hydrogen atom and a substituted hydrocarbon radical or an unsubstituted hydrocarbon radical.

Examples of the hydrocarbon radicals which $R_1$ may represent in the above-described formula for the aldehydes are methyl, ethyl, propyl, isopropyl, n-butyl, n-pentyl, isopentyl, hexyl, n-octyl, decyl, allyl, methallyl, butenyl, pentenyl, cyclohexyl, and the like.

The substituted hydrocarbon radicals which $R_1$ may represent in the above-described formula are the same as those hydrocarbon radicals described above wherein at least one of the hydrogen atoms has been replaced by an inorganic element or radical or by an organic radical. Examples of the inorganic elements that may be attached to the hydrocarbon radicals are the halogen atoms, such as chlorine and bromine. Examples of the organic radicals are the carboxyl and acyl radicals. Examples of inorganic radicals are the hydroxyl and sulfate radicals. The substituted hydrocarbon radicals may be exemplified by 2-chlorobutyl, 3-acetoxypentyl, 4-hydroxyoctyl, 3-bromo-4-acetyldodecyl, and the like.

In addition to the above-described aldehydes material which will liberate free aldehydes, such as trioxane (trimer of formaldehyde) paraformaldehyde, metaaldehyde and the like may also be utilized in the condensation reaction.

The preferred aldehydes to be utilized in producing the novel resins are those of the above-described formula wherein R is a member of the group consisting of hydrogen and hydrocarbon radicals containing from 1 to 8 carbon atoms. Formaldehyde is a particularly preferred aldehyde to be utilized in the production of the novel resin due to its low cost and ready attainability and to the superior quality of the products that it produces.

Examples of the aldehydes which may be employed in the production of the novel resins of the invention are:

Formaldehyde
Acetaldehyde
Propionaldehyde
2-pentenal
Butyraldehyde
2,4-pentadienal
Caproaldehyde
Valeraldehyde
Crotonaldehyde
Cinnamaldehyde Examples of the preferred aldehydes to be used in producing the novel resins of the invention are:

Formaldehyde
Acetaldehyde
Butyraldehyde
Valeraldehyde
Octanal
Heptanal

While the invention has been drawn specifically to the use of urea as the main carbamide compound to be used in producing the novel resins it should be understood that other obvious equivalent of urea, such as thiourea may be substituted for the urea compound in the condensation-polymerization reactions. Urea is by far the more preferred carbamide to be used in the production of the novel resins due to its low cost, ready attainability and exceptionally fine products that it produces.

Just single aldehydes, ureas or poly-functional urea derivatives may be utilized in producing the novel resins of the invention or a mixture of two or more of each substance may be used. Thus, for example, a mixture of formaldehyde and acetaldehyde may be condensed with the urea and a mixture of ethylene diurea and butylene diurea, or formaldehyde may be condensed with a mixture of urea and thiourea and a mixture of ethylene diurea and 1,4-butylene diurea.

To produce resins possessing the above-described superior properties, the proportion of the aldehydes, urea and poly-functional urea derivatives utilized may vary within certain specific limits. It has been found that resins possessing the superior qualities are produced when the quantity of the aldehyde employed varies between about 50 mol per cent to about 70 mol per cent, the quantity of the urea or its equivalent varies between about 25 mol per cent to 50 mol per cent and the quantity of the poly-functional urea derivatives varies between about .5 mol per cent to about 8 mol per cent. Exceptionally fine resins are obtained when the quantity of the aldehyde varies between about 60 mol per cent to 67 mol per cent the quantity of the urea or its equivalent between about 27 mol per cent to about 34 mol per cent and the quantity of the poly-functional urea derivative varies between about 1 mol per cent to about 6 mol per cent, and these are the more preferred amounts of ingredients to be utilized.

As described hereinabove the novel resins of the invention may be produced either by condensing the desired aldehyde and urea with the required minor amount of the poly-functional urea derivatives, and polymerizing the resulting condensation product, or alternatively by forming first a partial condensation product of the aldehyde and urea, adding the minor quantity of the poly-functional urea derivative to the said partial condensation product, and subsequently condensing and/or polymerizing the resulting admixture.

The condensation reactions employed in the above-described alternative processes may be accomplished on the bulk material or in a suitable solvent or diluent. The solvent if used may be a solvent for the reactants and product or a solvent for the reactants and a non-solvent for the condensation product. Suitable solvents include toluene, dioxane, hexane, and the like, and mixtures thereof.

The condensation may be conducted in the presence or absence of condensation catalysts. It is usually desirable, however, to utilize a catalyst to control the rate of the condensation. The preferred condensation catalysts include the strong basic condensing agents, such as the hydroxides, oxides and alcoholates of the alkali metals, as well as strong organic bases like the quaternary ammonium base. Other less basic agents may be used if desired, such as the alkaline earth hydroxides and oxides. In some cases it may be advantageous to employ acidic substances, such as sulfuric acid, hydrochloric acid, phosphoric acid, telluric acid, tungstic acid and the like, as well as acid salts, such as sodium acid sulfate, and metallic salts, such as zinc chloride. Mixtures of these catalysts may also be employed. The catalysts may be employed in the reaction mixture per se or, if desired, they may be employed as a solution with a solvent or diluent. Suitable organic solvents may be employed for this purpose. Particularly suited are the aqueous solutions of the alkali metal hydroxides, the quaternary ammonium bases, the acids and the acid salts.

The amount of the catalyst employed will depend upon the activity of the catalyst, the type of reactants present, the speed of reaction desired, etc., but in general, the amount should range from about .1% to about 6% by weight of total reactants. The preferred amount of catalysts varies between about 1% to 4% of total weight of reactants.

The temperature employed during the condensation reactions may vary over a wide range, depending upon the conditions of reaction, such as the type of reactants and catalysts employed. In some cases the reaction may take place by allowing the condensation mixture to stand at room temperature. In other cases, higher temperatures range in the order of about 50° to 100° C. may be required. The preferred temperature range lies between about 25° C. to about 80° C. Higher or lower temperatures may be employed if desired or necessary.

The condensation reactions may be conducted in the presence or absence of air. However, in some cases, it may be desirable to conduct the condensation under a blanket of inert gas such as nitrogen. Atmospheric, reduced or super-atmospheric, pressures may be employed as desired.

The condensation reactions may be executed in any convenient type of apparatus enabling intimate contact of the reactants and final separation of the condensation product from the reaction medium. The process may be carried out in batch, semi-continuous or continuous manner.

In case of the second alternative process, in which only a partial condensation product of the aldehyde and urea is desired, it will be necessary to interrupt the condensation reaction before it has reached completion. This may be accomplished by any suitable means, such as decreasing the reaction period, lowering the change in temperature and the like.

The reaction mixture resulting from the complete or partial condensation will contain in addition to the respective condensation products quantities of water formed during the condensation. In most cases it is preferred to separate this water from the combination product before the said product is subjected to polymerization. The removal of the water may be accomplished by any suitable method, such as distillation, filtration, extraction and the like. The more preferred method is to subject the solution to distillation under reduced pressure. This may be accomplished, for example, by heating the material in a water bath and removing the vapor by means of a vacuum pump.

The desired superior resins are then obtained by subjecting hydrated or dehydrated condensation product of the aldehyde, urea and polyfunctional urea or the derivative hydrated or dehydrated partial condensation product of the aldehyde and urea in admixture with the polyfunctional urea derivative to polymerization.

These condensation mixtures may be polymerized in bulk in the presence or absence of solvent or diluent. The solvent, if used, may be a solvent for the reactants and polymer or a solvent for the reactants and a non-solvent for the polymer. Emulsifying, granulating and wetting agents may be present. It is also possible to polymerize the condensation product while it is dispersed in the interstices in the fibrous material such as a fabric.

The condensation mixtures may be polymerized alone or in admixture with other already formed plastics, including natural resins, cellulose derivatives and synthetic resins. Other modifiers, including plasticizers, stabilizers, lubricants, dyes, pigments and fillers, may be added to the condensation product prior to polymerization on or may be added to the partially polymerized condensation product during polymerization, provided they do not chemically react with or otherwise adversely affect the ingredients of the reaction mixture. Otherwise, these modifiers may be added following polymerization. The nature and amount of the modifiers used will depend upon the particular reactants employed in the production of the condensation product, upon the method of polymerization and upon the intended use of the final product.

The polymerization is usually energized by heat, although both heat and light may be utilized. Temperatures of about 50° C. to about 80° C. are preferred; however, higher and lower temperatures may be used if desired. Atmospheric, superatmospheric or subatmospheric pressures may be employed as desired.

If desired, catalysts may be added to hasten the polymerization. The preferred catalysts are those which are soluble in the polymerizable material. Catalysts that may be utilized in the polymerization include the acids such as hydrochloric acid, sulfuric acid, acetic acid, lactic acid, peracids such as peracetic acid and compounds which liberate acids on heating. Peroxide catalysts such as hydrogen peroxide, benzoyl peroxide, acetyl peroxide, sodium peroxide, barium peroxide may also be used. Mixtures of catalysts may also be desirable. In most cases it is preferred to utilize an acid or acid liberating compound such as lactic acid in order to assure a relatively short polymerization period at a reasonable temperature.

The amount of the catalyst employed may vary over a considerable range depending upon the various conditions of the reaction. In case an acid catalyst is to be employed it is usually desirable to add sufficient acid to bring the mixture to a pH of about 5 to 6.5. In most cases the amount of the catalyst will vary between about .01% to about 5% by weight of the material to be polymerized. A preferred amount of catalyst will vary between about .01% to about 2% by weight of material being polymerized.

The polymerization reaction may be carried to completion without substantial interruption or it may be stopped at any point short of completion. Incomplete polymerization may be used to produce products which may be further worked and eventually substantially completely polymerized. The product may, for instance, be transferred to a mold of any desired configuration and again subjected to polymerization conditions. The unreacted material may be separated from the final polymer by solvent extraction, distillation, and the like. The separated polymer may then be worked up in any known or special manner.

The finally cured resins are characterized by their excellent transparency, their superior surfaces, free of bubbles and other deformities, their increased strength and flexibility. The resins may be made into the form of turney shapes, sheets, rods, tubes, thin films, filaments, fibers, etc. They may also be subjected to extrusion and to injection and compression molding in the presence or absence of added solvents. They also may be utilized in the molten or solvent solution in the production of surface coatings and impregnating agents. Because of their exceptionally fine transparency they are particularly suitable as substitutes for glass in the manufacture of dishes, glasses, airplane parts and the like.

To illustrate the manner in which the invention may be carried out the following examples are given. It is to be understood, however, that the examples are for the purpose of illustration only and they are not to be regarded as limiting the invention in any way.

*Example I*

A mixture of about 30 parts of urea, 80 parts of 40 vol. percent aqueous formaldehyde and about 3 parts of N caustic soda solution was allowed to stand for 24 hours. The solid cake obtained was then warmed until the solid dissolved and the resulting mixture was then acidified with N lactic acid solution to give a pH of about 5.0. About 5.5 parts of ethylene diurea were then added to the warm solution and the resulting solution was filtered. The filtrate was distilled under 15 mm. pressure of mercury at about 60° C. until the mixture was of convenient viscosity for casting. The resin was then cast and cured at 70° C. to form a hard, clear, transparent resin free of bubbles and possessing a very high degree of flexibility and strength.

*Example II*

A mixture of about 40 parts of a mixture of urea and thiourea, 80 parts of vol. percent aqueous formaldehyde, and about 5.5 parts of ethylene dithiourea is condensed in the presence of 3 parts of N caustic soda solution. The resulting solid cake is liquefied by warming, acidified with lactic acid and subjected to distillation under reduced pressure in order to remove the water of condensation. The dehydrated condensation product in the form of a thick syrup is then subjected to a temperature of about 70° C. to complete the polymerization. The resulting product is a hard, clear, transparent resin having the same superior properties as the resin described in Example I.

*Example III*

A mixture of about 30 parts of urea and 80 parts of 40 vol. percent aqueous formaldehyde is partially condensed in the presence of an aqueous solution of potassium hydroxide. The resulting mixture is mixed with about 4 parts of butylene diurea and subjected to further condensation in the presence of the potassium hydroxide. The mixture containing the condensation product is acidified and then dehydrated by distillation under reduced pressure. The resulting thick syrup is then cast and cured at a temperature of about 65° C. The product is a hard, clear, transparent resin free of bubbles and having excellent flexibility and strength.

Example IV

A mixture of about 30 parts of urea, about 50 parts of acetaldehyde and about 6 parts of ethylene diurea is condensed in the presence of 3 parts of sodium hydroxide. The mixture containing the condensation product is then acidified and dehydrated by distillation under reduced pressure. The hydrated syrup is then cast at a temperature of about 80° C. The resulting product is a hard, clear, transparent resin.

Example V

A mixture of about 50 parts of urea, about 160 parts of 40 vol. percent aqueous formaldehyde, and about 80 parts of 1,2,4 triureido butane is condensed in the presence of an aqueous solution of potassium hydroxide. The mixture containing the condensation product is then acidified and dehydrated by distillation under reduced pressure. The dehydrated syrup is then polymerized at a temperature of about 70° C. The resulting product is a hard, clear, transparent resin free of bubbles and other deformities.

Example VI

Clear transparent resins are prepared by condensing 65 mol percent of formaldehyde with 32 mol percent of urea, and about 3 mol percent of each of the following poly-functional urea derivatives; 1,4-butylene diurea, 1,4-butylene dithiourea, 1,3-heptylene diurea, 1,5-decylene dithiourea, and ethylene dithiourea. In each case the resulting resins possess superior characteristics similar to those described for the resin produced in Example I above.

We claim as our invention:

1. A process for the production of transparent resins which consists of partially condensing 50 mol percent to 70 mol percent of formaldehyde with 25 mol percent to 50 mol percent of a mixture of urea and thiourea in the presence of an alkaline condensation catalyst, adding .5 mol percent to 8 mol percent of ethylene diurea to the partial condensation product and completing the condensation in the presence of the alkaline condensation catalyst, acidifying the resultant mixture and subsequently polymerizing it at a temperature of about 50° C. to about 80° C.

2. A process for producing infusible transparent artificial resins which consists of partially condensing 50 mol percent to 70 mol percent of formaldehyde with 25 mol percent to 50 mol percent of urea in the presence of an alkaline condensation catalyst, adding 0.5 mol percent to 8 mol percent of ethylene diurea to the resulting partial condensation product and completing the condensation, acidifying the resulting product and subsequently polymerizing it at a temperature of 50° C. to 80° C.

3. A process for producing infusible transparent artificial resins which consists of partially condensing 50 mol percent to 70 mol percent of formaldehyde with 25 mol percent to 50 mol percent of urea in the presence of an alkaline condensation catalyst, adding 0.5 mol percent to 8 mol percent of ethylene thiourea to the resulting partial condensation product and completing the condensation, acidifying the resulting product and subsequently polymerizing it at a temperature between 50° C. to 80° C.

4. A process for producing infusible transparent artificial resins which consists of condensing 50 mol percent to 70 mol percent of formaldehyde with 25 mol percent to 50 mol percent of a member of the group consisting of urea, thiourea, and mixtures thereof, and 0.5 mol percent to 8 mol percent of a polyfunctional urea compound of the formula $(H_2NCXNH)_nR$ wherein X is a member of the group consisting of oxygen and sulfur, $n$ is an integer greater than 1, and R is a polyvalent hydrocarbon radical containing from 1 to 10 carbon atoms and having a valency equal to $n$, acidifying the resulting product, dehydrating the acidified mixture by distillation, and subsequently polymerizing it at a temperature between 50° C. and 80° C.

5. A process for producing infusible transparent artificial resins which consists of partially condensing 50 mol percent to 70 mol percent of a member of the group consisting of formaldehyde, aldehydes of the formula $$\overset{H}{\underset{}{R\overset{|}{C}=O}}$$

wherein R is a hydrocarbon radical containing from 1 to 8 carbon atoms, and substances liberating the afore-described aldehydes, with 25 mol percent to 50 mol percent of a member of the group consisting of urea, thiourea, and mixtures thereof, adding to the resulting partial condensation product 0.5 mol percent to 8 mol percent of a polyfunctional urea compound of the formula $(H_2NCXNH)_nR$ wherein X is a member of the group consisting of oxygen and sulfur, $n$ is an integer greater than 1, and R is a polyvalent hydrocarbon radical containing from 1 to 10 carbon atoms and having a valency equal to $n$, completing the condensation and subsequently polymerizing the resulting condensation product.

6. A process for producing infusible transparent resins which consists of condensing 50 mol per cent to 70 mol per cent of a member of the group consisting of formaldehyde, aldehydes of the formula $$\overset{H}{\underset{}{R\overset{|}{C}=O}}$$

wherein R is a hydrocarbon radical containing from 1 to 8 carbon atoms, and substances liberating the afore-described aldehydes, with 25 mol per cent to 50 mol per cent of a member of the group consisting of urea, thiourea, and mixtures thereof, and 0.5 mol per cent to 8 mol per cent of a polyfunctional urea compound of the formula $(H_2NCXNH)_nR$ wherein X is a member of the group consisting of oxygen and sulfur, $n$ is an integer greater than 1 and R is a polyvalent hydrocarbon radical containing from 1 to 10 carbon atoms and having a valency equal to $n$, and subsequently polymerizing the resulting condensation product.

7. An infusible transparent flexible resin obtained by partially condensing 50 mol per cent to 70 mol per cent of formaldehyde with 25 mol per cent to 50 mol per cent of a mixture of urea and thiourea in the presence of an alkaline condensation catalyst, adding 0.5 mol per cent to 8 mol per cent of ethylene diurea to the partial condensation product and completing the condensation in the presence of the alkaline condensation catalyst, acidifying the resultant mixture and subsequently polymerizing it at a temperature of 50° C. to 80° C.

8. An infusible transparent flexible resin obtained by partially condensing 50 mol per cent to 70 mol per cent of formaldehyde with 25 mol per cent to 50 mol per cent of urea in the presence of an alkaline condensation catalyst, adding 0.5 mol per cent to 8 mol per cent of ethylene diurea to the resulting partial condensation product and completing the condensation, acidifying the resulting product and subsequently polymerizing it at a temperature of 50° C. to 80° C.

9. An infusible transparent flexible resin obtained by partially condensing 50 mol per cent to 70 mol per cent of formaldehyde with 25 mol per cent to 50 mol per cent of urea in the presence of an alkaline condensation catalyst, adding 0.5 mol per cent to 8 mol per cent of ethylene thiourea to the resulting partial condensation product and completing the condensation, acidifying the resulting product and subsequently polymerizing it at a temperature between 50° C. and 80° C.

10. An infusible transparent flexible resin obtained by condensing 50 mol per cent to 70 mol per cent of formaldehyde in 25 mol per cent to 50 mol per cent of a member of the group consisting of urea, thiourea, and mixtures thereof, and 0.5 mol per cent to 8 mol per cent of a polyfunctional urea compound of the formula $(H_2NCXNH)_nR$ wherein X is a member of the group consisting of oxygen and sulfur, $n$ is an integer greater than 1, and R is a polyvalent hydrocarbon radical containing from 1 to 10 carbon atoms and having a valency equal to $n$, acidifying the resulting product, dehydrating the acidified mixture by distillation, and subsequently polymerizing the dehydrated mixture at a temperature between 50° C. and 80° C.

11. An infusible transparent resin obtained by condensing 50 mol per cent to 70 mol per cent of a member of the group consisting of formaldehyde, aldehydes of the formula

wherein R is a hydrocarbon radical containing from 1 to 8 carbon atoms, and substances liberating the aforedescribed aldehydes, with 25 mol per cent to 50 mol per cent of a member of the group consisting of urea, thiourea, and mixtures thereof, and 0.5 mol per cent to 8 mol per cent of a polyfunctional urea compound of the formula $(H_2NCXNH)_nR$ wherein X is a member of the group consisting of oxygen and sulfur, $n$ is an integer greater than 1 and R is a polyvalent hydrocarbon radical containing from 1 to 10 carbon atoms and having a valency equal to $n$, and subsequently polymerizing the resulting condensation product.

12. An infusible transparent resin obtained by condensing 60 mol per cent to 67 mol per cent of a member of the group consisting of formaldehyde, aldehydes of the formula

wherein R is a hydrocarbon radical containing from 1 to 8 carbon atoms, and substances liberating the aforedescribed aldehydes, with 27 mol per cent to 34 mol per cent of a member of the group consisting of urea, thiourea, and mixtures thereof, and 1 mol per cent to 6 mol per cent of a polyfunctional urea compound of the formula $(H_2NCXNH)_nR$ wherein X is a member of the group consisting of oxygen and sulfur, $n$ is an integer greater than 1 and R is a polyvalent hydrocarbon radical containing from 1 to 10 carbon atoms and having a valency equal to $n$, and subsequently polymerizing the resulting condensation product.

13. A process for producing infusible transparent resins which consists of condensing 60 mol per cent to 67 mol per cent of a member of the group consisting of formaldehyde, aldehydes of the formula

wherein R is a hydrocarbon radical containing from 1 to 8 carbon atoms, and substances liberating the aforedescribed aldehydes, with 27 mol per cent to 34 mol per cent of a member of the group consisting of urea, thiourea, and mixtures thereof, and 1 mol per cent to 6 mol per cent of a polyfunctional urea compound of the formula $(H_2NCXNH)_nR$ wherein X is a member of the group consisting of oxygen and sulfur, $n$ is an integer greater than 1 and R is a polyvalent hydrocarbon radical containing from 1 to 10 carbon atoms and having a valency equal to $n$, and subsequently polymerizing the resulting condensation product.

PHILIP JAMES GARNER.
RALPH EDWARD BOWMAN.

REFERENCES CITED

The following references are of record in the file of this patent:

UNITED STATES PATENTS

| Number | Name | Date |
|---|---|---|
| 2,312,688 | D'Alelio | Mar. 2, 1943 |
| 2,400,016 | Meyer | May 7, 1946 |

FOREIGN PATENTS

| Number | Country | Date |
|---|---|---|
| 506,507 | Great Britain | May 30, 1939 |